3,430,863
Patented Mar. 4, 1969

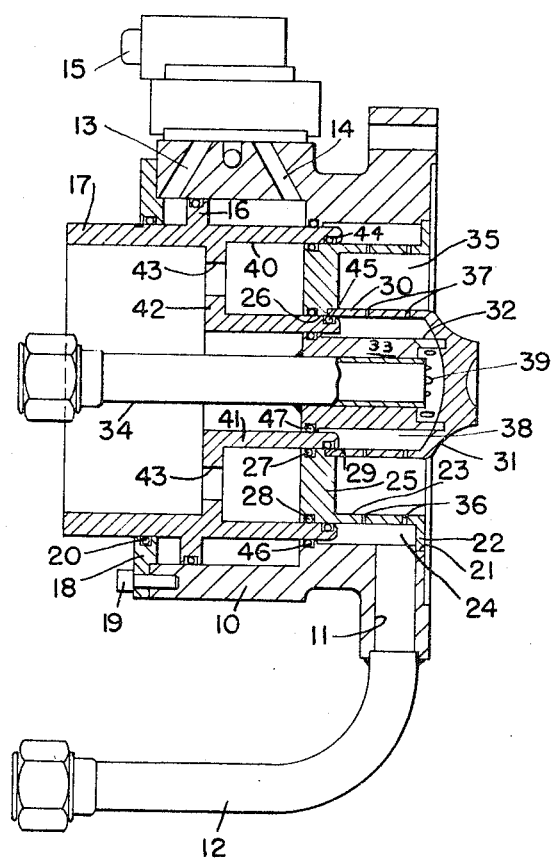

3,430,863
FUEL-OXIDIZER INJECTION
John J. Canavan, Mine Hill, Dover, Henry Gawrylowicz, Wallington, William J. Buckley, Jr., Sparta, and William Johns, Lake Hopatcong, N.J., assignors to the United States of America as represented by the Secretary of the Army
Filed Dec. 28, 1966, Ser. No. 605,494
U.S. Cl. 239—412  5 Claims
Int. Cl. B05b 7/12

ABSTRACT OF THE DISCLOSURE

An annular, throttling fuel-oxidizer injector for variable thrust rocket structures that provides an improved thrust management over the entire thrust range including a complete shut-off capability. A control piston is employed having a concentric pair of annular shuttle valve members that extend into respective fuel and oxidizer supply cavities that are positioned on either side of a combustion chamber annulus having ported sidewalls which are controlled by the shuttle valve.

---

This invention relates to injectors and, more particularly, to a fuel-oxidizer injector.

Variable thrust rocket arrangements, heretofore were of a less effective multiple injector or multiple rocket type of structure having limited thrust control, low fuel efficiencies or less than desirable areas of performance.

It is an object of the invention to provide an inexpensive, simple annular throttling fuel-oxidizer injector arrangement that provides an improved thrust management over the entire thrust range including a complete shut-off capability.

Another object is to provide such an injector arrangement having valve means with a prolonged life expectancy.

These and other objects, advantages and features will become more apparent from the following description and accompanying drawing which is a longitudinal sectional view of an injector arrangement embodying the principles of the invention.

The injector arrangement preferably has an annular main housing 10 is laterally ported at 11 for a fluid communicating connection with fuel inlet conduit 12 and at 13 and 14 for communicatively connecting a servo-control structure 15 with rearward and forward variable chambers adjacent the laterally extending sealing flange 16 of the longitudinally movable annular control piston 17. An appropriate sealing cover 18 is secured by a plurality of sealed screw means 19 to the rearward portion of housing 10 and has an O-ring seal 20 at its inner extremity for slidably receiving the rearward portion of piston 17 upon its assembly in the injector.

Housing 10 has an internal annular recess 21 at its forward end in which is seated an outwardly extending, forwardmost annular flange 22 of a forwardly opening, centrally apertured cup-like member 23 whose sidewall is radially spaced inside the housing annulus to define a fuel cavity 24. The cup base portion 25 has a central opening 26 defining an interior wall, O-rings 27 and 28 being provided on the inner and outer walls of the base 25 for a purpose to be described. Wall 26 of base 25 has a forwardmost annular recess 29 which seats a rearwardly extending cylindrical sidewall 30 of a rearwardly opening oxidizer-injector cap 31.

The base interior surface of cap 31 is suitably recessed to seat forwardly protruding laterally apertured means 32 of an enlarged extension member 33 that is appropriately secured to an oxygen inlet cylindrical tube 34 concentrically spaced within and extending longitudinally through piston 17.

Concentrically spaced walls 23 and 30 of the cup and cap define a combustion chamber annulus 35, and each contains a plurality of lateral orifices 36 and 37, respectively, that place the combustion chamber 35 in fluid communication with fuel cavity 24 and oxidizer cavity 38 which is located between the concentrically spaced cap wall 30 and oxygen inlet extension 33, and apertures 39 of extension protrusion 32 fluidly communicate the cavity 38 with oxygen inlet tube 34.

The control piston 17 has a concentric pair of annular shuttle valve members 40 and 41 that respectively extend forwardly into the fuel cavity 24 and oxidizer cavity 38 for controlled movement therewithin, and the shuttle valve portions 40, 41 are connected by an integral transversely extending disc 42 that is appropriately apertured at 43 to facilitate relative motion between piston 17 and cup base 25. Shuttle valve O-ring seals 44 and 45 respectively cooperate with O-rings 46, 28 and 47, 27 to provide the desired sealing arrangement for the shuttle portion of the piston 17, the O-rings all being located outside of the combustion annulus 35. Thus, the life expectancy of the shuttle valve arrangement is prolonged since prior cook-off adversities are eliminated.

We claim:
1. In a fuel-oxidizer injector arrangement having a main housing annulus containing fuel inlet means and a relatively smaller, concentrically spaced cylindrical tube containing oxidizer inlet means, said main housing annulus having an internal annular recess at a forwardmost portion thereof,
   a forwardly opening, centrally apertured cup-like member having a forwardly extending sidewall radially spaced inside said housing annulus to define a fuel cavity and terminating sidewall in an outwardly extending annular flange seated in said main housing internal forward recess, said cup member having a rearward base portion provided with a central opening defining an interior wall radially spaced outside said cylindrical tube, said base having a forwardmost internal annular recess,
   a rearwardly opening oxidizer injector cap in engagement with said cylindrical tube and having a rearwardly extending cylindrical sidewall radially spaced outside said tube to define an oxidizer cavity and seated in said base annular recess, said cup and cap sidewalls being radially spaced and defining therebetween a combustion annulus, said cup sidewall having a plurality of fuel orifices fluidly communicating said fuel cavity with said combustion annulus said cap sidewall having a plurality of oxidizer orifices fluidly communicating said oxidizer cavity with said combustion annulus, and
   a control piston having a concentric pair of annular shuttle valve members extending into corresponding ones of said fuel and oxidizer cavities.
2. The structure in accordance with claim 1 wherein seal means are provided intermediate said control piston and both said fuel and oxidizer cavities.

3. The structure of claim 2 in which a servo control has means fluidly communicating with said piston for longitudinally moving said piston relative to said main housing annulus.

4. The arrangement of claim 3 wherein said shuttle valve members are radially spaced outside an oxidizer inlet conduit that is secured to said cylindrical tube.

5. The arrangement of claim 4 in which said shuttle valve members are connected by a laterally extending base portion of said piston, and said base portion is provided with apertured means.

References Cited

UNITED STATES PATENTS

| | | | |
|---|---|---|---|
| 2,810,259 | 10/1957 | Burdett | 60—39.74 |
| 3,215,352 | 11/1965 | Meraz | 239—412 |

SAMUEL FEINBERG, *Primary Examiner.*

U.S. Cl. X.R.

60—258; 137—625.4; 239—415, 416, 543